(12) United States Patent
Thomas et al.

(10) Patent No.: US 7,844,309 B2
(45) Date of Patent: Nov. 30, 2010

(54) EXCHANGEABLE KEYMAT

(75) Inventors: Paul Alistair Thomas, Copenhagen K (DK); Morten Saxbol, Dragoer (DK); Brian Spidsbjerg Nielsen, Copenhagen (DK)

(73) Assignee: Nokia Corporation, Espoo (FI)

( * ) Notice: Subject to any disclaimer, the term of this patent is extended or adjusted under 35 U.S.C. 154(b) by 360 days.

(21) Appl. No.: 10/788,427

(22) Filed: Feb. 27, 2004

(65) Prior Publication Data

US 2005/0192064 A1  Sep. 1, 2005

(51) Int. Cl.
*H04M 1/00* (2006.01)
*H04B 1/38* (2006.01)

(52) U.S. Cl. ............... 455/575.1; 455/575.8; 455/90.3; 455/347

(58) Field of Classification Search ............... 455/575.2, 455/575.1, 550.1, 569.1, 90.3, 433.11, 66.1; 379/433.11, 433.12, 434, 428.01, 433.13, 379/368, 433.07
See application file for complete search history.

(56) References Cited

U.S. PATENT DOCUMENTS

| | | | | |
|---|---|---|---|---|
| 4,634,818 A | * | 1/1987 | Hayes-Pankhurst et al. | 200/5 A |
| 4,764,770 A | * | 8/1988 | Church | 200/5 A |
| 5,848,152 A | * | 12/1998 | Slipy et al. | 379/433.13 |
| 5,982,881 A | * | 11/1999 | Mischenko | 379/433.11 |
| 6,041,120 A | * | 3/2000 | Olkkola | 379/433.01 |
| 6,229,994 B1 | * | 5/2001 | Pavet | 455/575.1 |
| 6,731,913 B2 | * | 5/2004 | Humphreys et al. | 455/90.3 |
| 6,839,430 B2 | * | 1/2005 | Kwak | 379/433.01 |
| 6,847,806 B2 | * | 1/2005 | Curtis et al. | 455/90.3 |
| 6,876,543 B2 | * | 4/2005 | Mockridge et al. | 455/347 |
| 6,950,516 B2 | * | 9/2005 | Pirila et al. | 379/433.12 |
| 2003/0119543 A1 | * | 6/2003 | Kfoury et al. | 455/550 |
| 2003/0143961 A1 | * | 7/2003 | Humphreys et al. | 455/90 |
| 2003/0153349 A1 | * | 8/2003 | Sun | 455/550 |
| 2003/0201983 A1 | * | 10/2003 | Jokinen et al. | 345/169 |
| 2005/0130721 A1 | * | 6/2005 | Gartrell | 455/575.8 |
| 2006/0165465 A1 | * | 7/2006 | Wu | 400/491 |

FOREIGN PATENT DOCUMENTS

EP  1028574  8/2000
JP  2001-076581  * 3/2001

* cited by examiner

*Primary Examiner*—Charles N Appiah
*Assistant Examiner*—Emem Stephen

(57) ABSTRACT

A communication device comprising a keymat, a cover, and a substrate comprising a plurality of key switches is disclosed. The keymat comprises a plurality of lips located at the edges of the keymat. The cover comprises a plurality of indentations configured to receive the plurality of lips. The indentations are located at the edges of a recess for removably mounting the keymat.

19 Claims, 4 Drawing Sheets

EXCHANGEABLE KEYMAT

FIELD OF INVENTION

The present invention relates to a communication device with an on a cover exteriorly attachable keymat, a cover for an exteriorly attachable keymat, and an exteriorly attachable keymat.

BACKGROUND OF INVENTION

It has become desirable for users of radiotelephones to replace a cover of the radiotelephone easily without requiring any special training or tools. Telephone handsets with exchangeable covers are known, e.g. from EP 1028574 A2. EP 1028574 A2 discloses a radio telephone comprising a front and a back cover. The radio telephone further comprises an inner housing retaining electronic components of the radiotelephone.

FIG. 1 shows a prior art radiotelephone 1 with a front cover 2, a back cover 3, an inner housing 4, and a keymat 5. To assemble the radiotelephone 1, the front and back covers 2, 3 are attached to mutual sides of the inner housing 4. The keymat 5 is sandwiched between the front cover 2 and the inner housing 4 such that keys 6 of the keymat 5 extend through holes 7 in the front cover 2 and, when a key is pressed, actuate key switches (not shown) on the inner housing 4. The main purpose of the keymat is to act as an interface between the user and the functions of the radiotelephone.

A problem with known technology is that a change of keymat require that the front cover is removed from the internal housing.

Another problem is that the front cover limits the freedom to design the keys of the keymat, since the keys have to fit the holes of the front cover.

U.S. 2003/0201983 discloses a keymat for use with a mobile station. The keymat includes a web for interconnecting a plurality of keys. The keymat is attached externally on a cover of the mobile station to permit a user to exchange the keymat for another. A plurality of key pins extends through openings in the cover of the mobile station. The keymat has retaining means for removably retaining the keymat to the mobile station. The retaining means are either key pins integrally formed with the keymat and extending inwardly through openings in the cover of the mobile station and provided with extensions on the key pins to engage the interior surface of the cover, or recesses in the keymat for receiving the key pins, or a slide plate disposed inward of the cover for engaging a keymat fixedly attached to a plurality of key pins that forms a recess for engaging the slide plate.

A problem with this solution is that the edges of the keymat is unprotected and not tightly attached to the cover, and may cause that the keymat is ripped off the cover during every day use, such as keeping the mobile station in a pocket or bag. Another problem with this solution is that attachment and removal are difficult. Further, a problem with this solution is that, when removing the keymat, the stress on the extensions for retaining the keymat many times will cause that the extensions are torn off, and it will not be possible to re-attach the keymat.

SUMMARY OF THE INVENTION

An object of the present invention is to overcome at least a part of the above stated problems.

The above object, together with numerous other objects, which will become evident from the detailed description below, is obtained according to a first aspect of the present invention by a communication device comprising a keymat, a cover, and a substrate comprising a plurality of key switches, wherein the keymat is exteriorly attachable on the cover, and keypins of said keymat extend through holes of said cover towards said plurality of key switches, wherein the keymat comprises a plurality of lips located at the edges of the keymat, and the cover comprises a plurality of indentations configured to receive the plurality of lips, wherein the indentations are located at the edges of a recess for removably mounting the keymat.

The keymat may comprise one or more guiding pieces, and the cover may comprise one or more corresponding guiding recesses. The guiding pieces may be arranged in direct connection to one or more of the plurality of lips.

The keymat may be provided with one or more guiding recesses, and the cover may be provided with one or more corresponding guide pieces. The guiding pieces may be one or more ribs extending to be received by the guide pieces.

The above object, together with numerous other objects, which will become evident from the detailed description below, is obtained according to a second aspect of the present invention by a cover for a communication device comprising a recess for receiving a keymat comprising a plurality of lips, wherein the recess is provided with a plurality of indentations located at the edges of the recess for receiving the plurality of lips.

The cover may further comprise one or more guiding recesses. The one or more guiding recesses may be arranged in direct connection to one or more of said plurality of indentations.

The cover may further comprise one or more guiding pieces. The guiding pieces may be one or more ribs on a surface of the cover facing a place where a keymat is to be mounted.

The above object, together with numerous other objects, which will become evident from the detailed description below, is obtained according to a third aspect of the present invention by a keymat for removable mounting on a cover of a communication device, comprising lips located at the edges of the keymat. The lips are configured to insert into indentations of said cover.

The keymat may further comprise one or more guiding pieces. The guiding pieces may be arranged in direct connection to one or more of said plurality of lips.

The keymat may further comprise one or more guiding recesses. Said one or more guiding recesses may be an incision in a surface that is to be in contact with a cover when mounted on the cover.

The keymat may be moulded in one piece.

A particular feature of the present invention relates to the possibility to mount, demount, and remount the keymat without any tools or training.

A particular advantage of the present invention is easier mounting, demounting, and remounting of a keymat since the cover do not have to be removed. Further, an advantage of the invention is that the retaining of the keymat is improved, and the risk for unintentional removal of the keymat during wearing and using the communication device is decreased. Another advantage of the present invention is that a designer has more freedom in designing different keymats, and the user has more freedom in changing keymats. Another advantage of the present invention is a more attractive appearance, since the recess of the cover enables the keymat to be in level of the cover. Another advantage of the present invention is reduced costs since the exchangeable keymat can be moulded in one piece, and material can be saved.

DETAILED DESCRIPTION OF PREFERRED EMBODIMENTS

Figure 1:
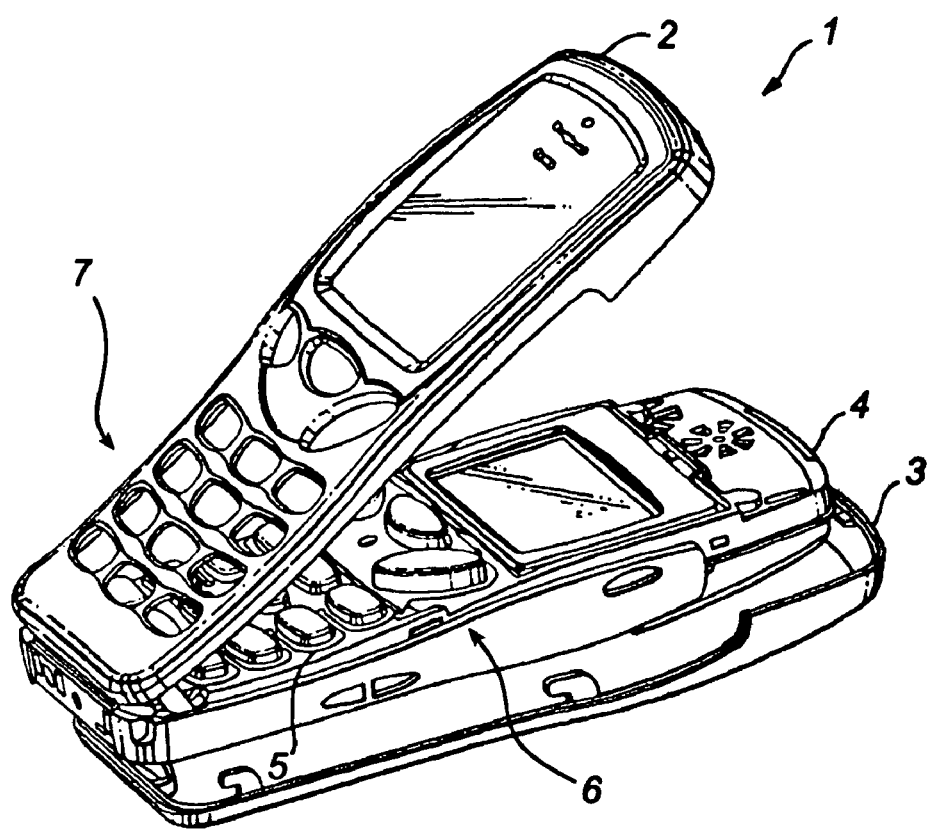
FIG. 1 shows a telephone according to prior art.
Figure 2:
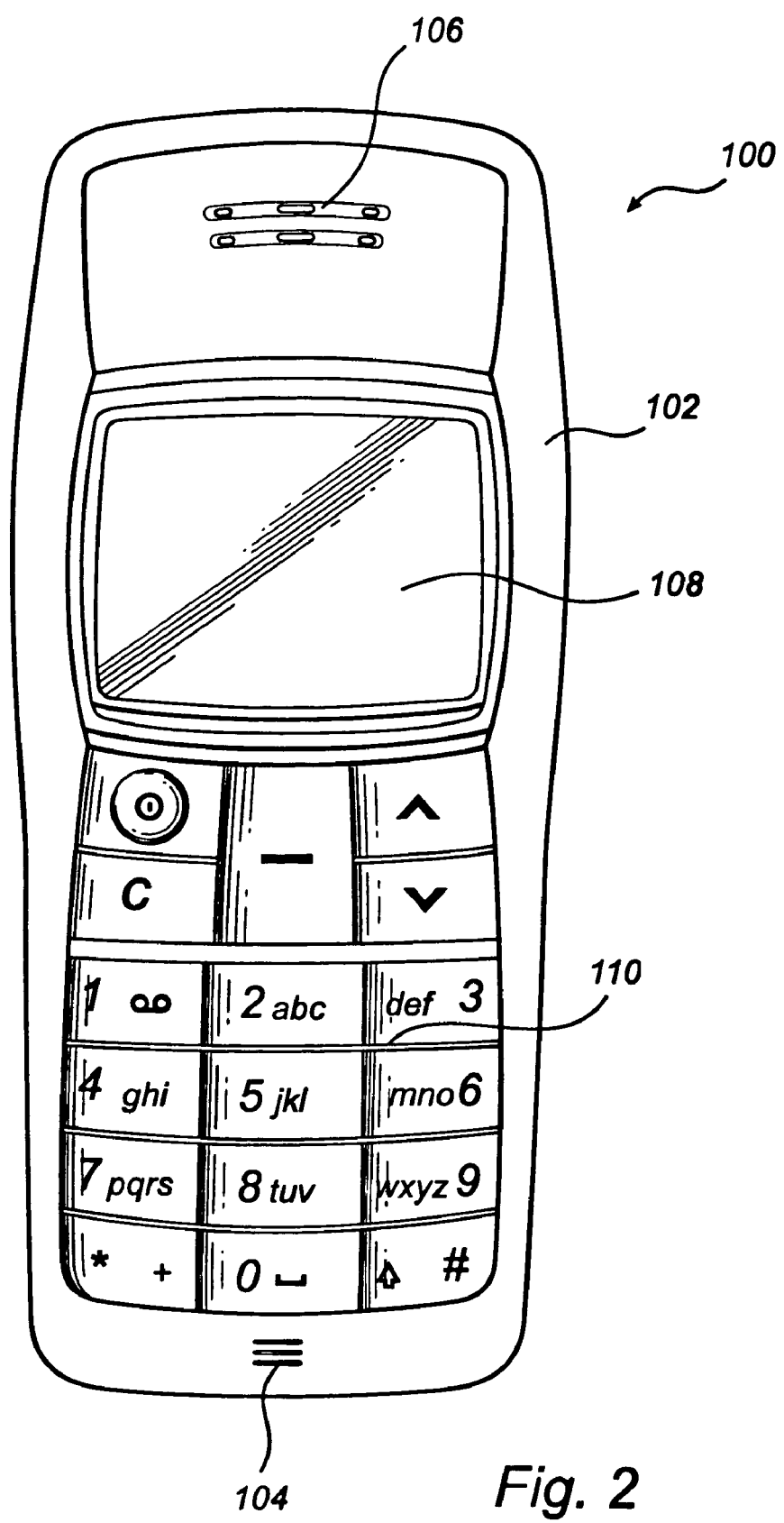
FIG. 2 shows a communication device according to the present invention.

FIG. 2 shows a communication device 100 which is provided with a plurality of parts, e.g. a processor (not shown), radio electronics (not shown), a substrate (not shown), a microphone 104, a speaker 106, a display 108 and a plurality of key switches (not shown). The communication device 100 is also provided with a front cover 102, a back cover (not shown) and a keymat 110.

Figure 3:
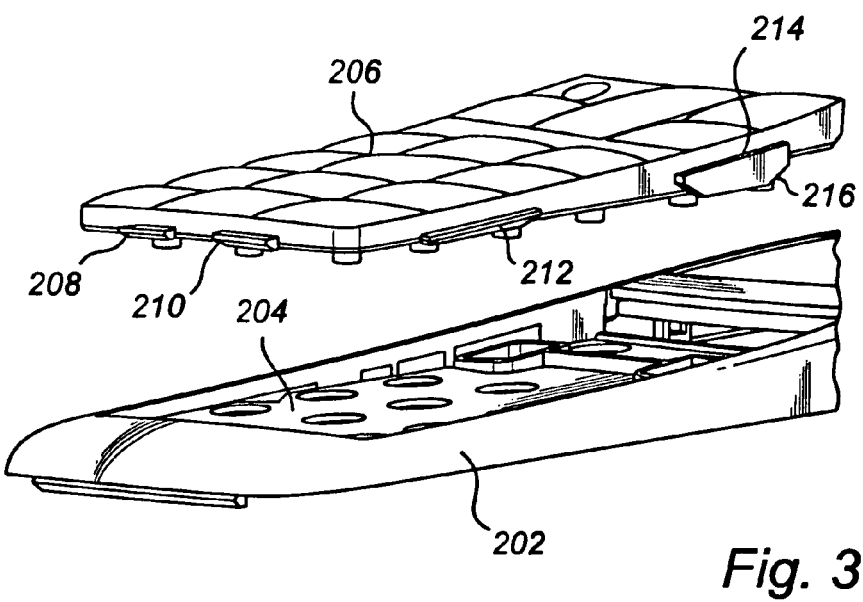
FIG. 3 shows an embodiment according to the present invention.

FIG. 3 shows a front cover 202 and a keymat 206 according to an embodiment of the present invention, wherein the front cover 202 is provided with a recess 204 to receive the keymat 206. The keymat 206 is preferably made of rubber or any elastomer. The keymat 206 is provided with a plurality of lips 208, 210, 212, 214 that enables a removable mounting of the key mat 206 on the front cover 202. The keymat 206 is mounted by bending the keymat 206 slightly and putting it into the recess 204, and the elastic properties of the keymat 206 will force the lips into corresponding indentations of the front cover 202. Similarly, the keymat 206 is demounted by bending the keymat 206 slightly and lifting it out of the recess 204. The keymat 206 is also provided with a guide piece 216 that enables guiding the keymat 206 to a correct position at the front cover 202. The guide piece 216 is received by a corresponding guide recess in the front cover 202.

Figure 4A:
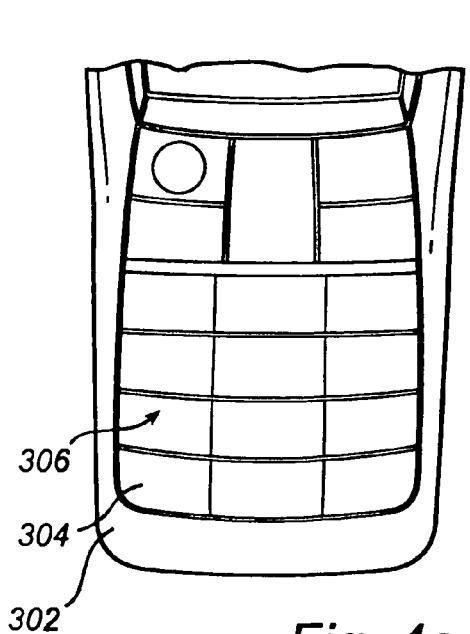
FIGS. 4a and 4b are views of a front cover with a mounted keymat seen from opposite sides, respectively.

FIG. 4a is a front view of a front cover 302 with a mounted keymat 304. When the keymat 304 is mounted in the front cover 302, the lips are not visible, and an attractive appearance is achieved. A designer now has the ability to design the keypad with the keys 306 of the keymat 304 more freely.

Figure 4B:
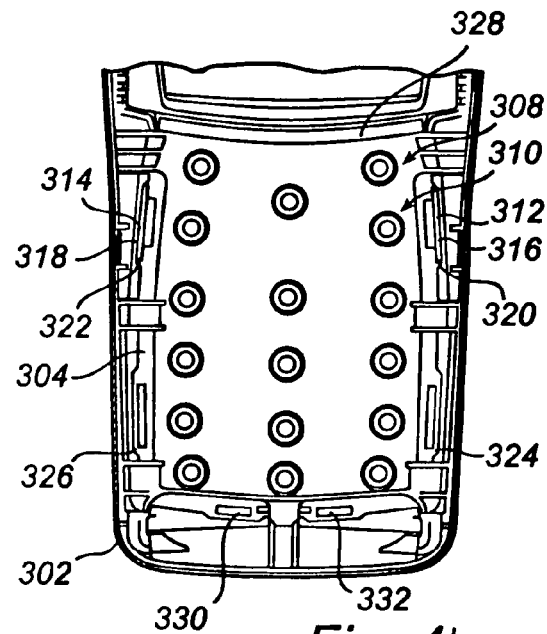

FIG. 4b is a view of the front cover 302 with the mounted keymat 304 from the opposite side compared to FIG. 4a. A plurality of pressure transmitters 308, one for each key 306 of the keymat 304, protrudes through a plurality of holes 310 in the front cover 302, thereby enabling actuation of a plurality of key switches of a communication device. The pressure transmitters 308 are bosses formed when moulding the keymat 304.

Guide pieces 312, 314 guide the keymat 304 to a correct position by fitting into recesses 316, 318 of the front cover 302. The guide pieces 312, 314 are flanges extending from the surface of the keymat 304 facing the cover 302, through the recesses 316, 318, when the keymat 304 is attached to the cover 302. Lips 320, 322, 324, 326, 328, 330, 332 of the keymat 304 insert into indentations of the front cover 302 to hold the keymat 304 without adhesive, glue, tape, or other mounting means. Preferably, the guide pieces 312, 314 are arranged in direct contact with some of the snap connectors 320, 322.

Figure 5:
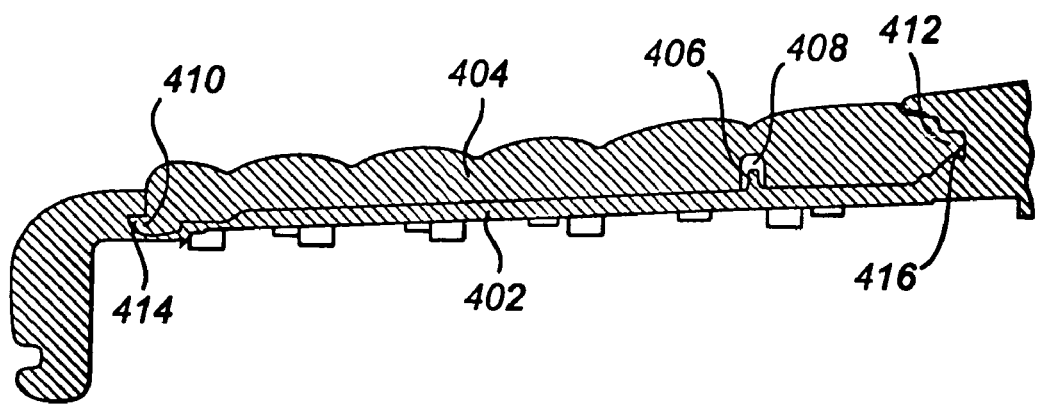
FIG. 5 shows a cross section view of an embodiment of the present invention.

FIG. 5 shows a cross section view of a front cover 402 and a keymat 404 according to an embodiment of the present invention. The front cover 402 is shown with the mounted keymat 404. The front cover 402 is provided with a guide piece 406, that is received by a guiding recess 408 in the keymat 404 to ensure a correct positioning of the keymat 404. The guide piece 406 is a rib on the surface facing the keymat 404 and the guide recess 408 is an incision in the surface facing the cover 402. The keymat is provided with lips 410, 412 that are received by indentations 414, 416 in the front cover 402 to hold the keymat 404 without adhesive, glue, tape, or other mounting means.

Figure 6:
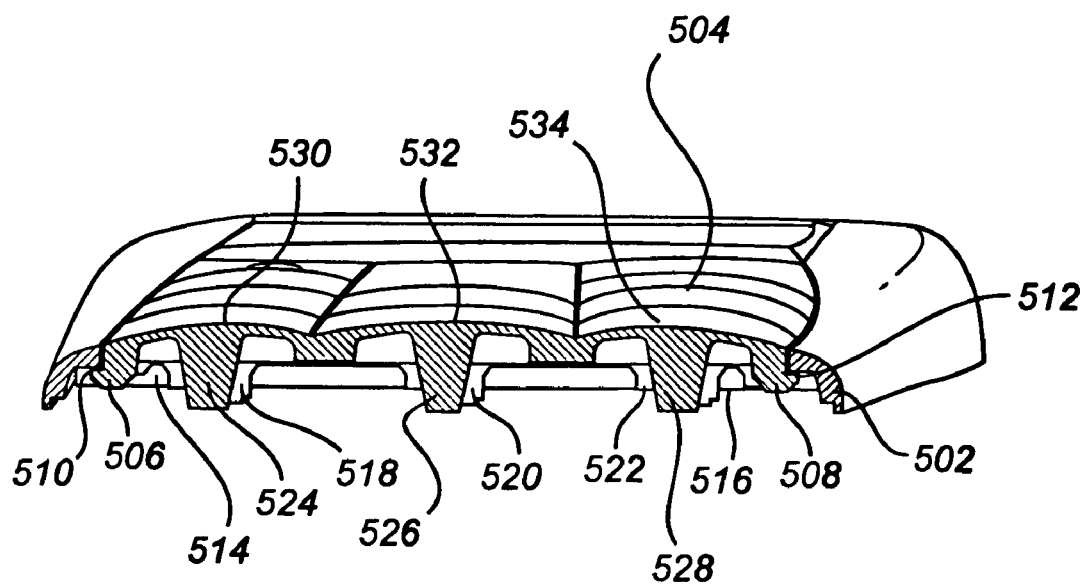
FIG. 6 shows a cross section view of an embodiment of the present invention.

FIG. 6 shows a cross section view of a front cover 502 and a keymat 504 according to an embodiment of the present invention. The front cover 502 is shown with the mounted keymat 504. The keymat is provided with lips 506, 508 that are received by indentations 510, 512 in the front cover 502 to hold the keymat 504 without adhesive, glue, tape, or other mounting means. The front cover 502 is further provided with locking parts 514, 516 that forces the lips 506, 508 of the keymat 504 into the indentations 510, 512 of the front cover 502 to improve gripping pressure.

The front cover 502 is provided with a plurality of holes 518, 520, 522 to enable pressure transmitters 524, 526, 528 to protrude through the front cover 502 to reach key switches located on a substrate of the communication device (not shown).

The keymat 504 is provided with a plurality of keys 530, 532, 534. When one of the keys 530, 532, 534 is pressed, the corresponding pressure transmitter 524, 526, 528 displaces and actuates the corresponding key switch (not shown).

In the above presented embodiments of the present invention, a keymat is mounted on a front cover. It is the most common design of a communication device to locate a keypad on the front of the communication device. However, a keypad can be located on a back cover, on a cover of a tiltable and/or swivable part where the terms "front" and "back" are not applicable, or anywhere on a cover of the communication device. Therefore, the invention is applicable on any cover used for a communication device.

The invention claimed is:

1. An apparatus comprising a bendable elastomeric keymat, a cover including a recess, and a substrate located within the cover comprising a plurality of key switches, wherein, said keymat comprises a plurality of lips located at and extending outward from edges of said keymat toward a rim of the recess and a plurality of pressure transmitters extending from an interior surface of the keymat, and said cover comprises a plurality of indentations configured to receive said plurality of lips, wherein the bendable elastomeric keymat comprises elastic properties and is configured so that an entirety of the bendable elastomeric keymat bends to outwardly force the lips toward the rim of the recess and into the plurality of indentations on the cover to attach the edges of the keymat to the cover and said indentations are located at edges of the recess for removably mounting said keymat, the cover also includes a plurality of apertures through which the plurality of pressure transmitters pass to activate the plurality of key switches and a plurality of locking parts extending from an interior surface of the recess adjacent the indentations so that the plurality of locking parts interface with the lips of the keymat and, along with the elastic properties of the keymat, force the lips of the keymat into the indentations of the cover.

2. The apparatus according to claim 1, wherein said keymat comprises one or more guiding pieces, and said cover comprises one or more corresponding guiding recesses.

3. The apparatus according to claim 2, wherein said guiding pieces are arranged in direct connection to one or more of said plurality of lips.

4. The apparatus according to claim 1, wherein said keymat comprises one or more guiding recesses, and said cover comprises one or more corresponding guide pieces.

5. The apparatus according to claim 4, wherein said guiding pieces comprises one or more ribs extending to be received by said guide recesses.

6. A cover for a communication device comprising a recess for receiving an elastomeric keymat comprising a plurality of lips extending outward from edges of the elastomeric keymat, the cover further comprising a plurality of indentations located at the edges of said recess for receiving said plurality of lips and attaching the edges of the elastomeric keymat to the cover, where the plurality of indentations are configured so that when an entirety of the keymat is bent elastic properties of the elastomeric keymat outwardly force the lips towards and into the plurality of indentations, and a plurality of apertures through which a plurality of pressure transmitters of the elastomeric keymat pass to activate a plurality of key switches located within the cover, the cover including a plurality of locking parts extending from an interior surface of the recess adjacent the indentations so that the plurality of locking parts interface with the lips of the keymat and, along with the elastic properties of the keymat, force the lips of the keymat into the indentations.

7. Cover according to claim 6, further comprising one or more guiding recesses.

8. Cover according to claim 7, wherein said one or more guiding recesses are arranged in direct connection to one or more of said plurality of indentations.

9. Cover according to claim 6, further comprising one or more guiding pieces.

10. Cover according to claim 9, wherein said guiding pieces are one or more ribs on a surface of said cover facing a place where a keymat is to be mounted.

11. A bendable elastomeric keymat for removable mounting on a cover of a communication device, comprising lips located at and extending from edges of said bendable elastomeric keymat, the lips being configured to extend outwardly toward a rim of the cover and insert into indentations of said cover, wherein the bendable elastomeric keymat comprises elastic properties and is configured so that an entirety of the bendable elastomeric keymat bends to outwardly force the lips toward the rim of the cover and into the indentations on the cover to attach the edges of the elastomeric keymat to the cover, the lips being configured to interface with a plurality of locking parts that extend from the cover adjacent the indentations that, along with the elastic properties of the keymat, force the lips of the keymat into the indentations, the bendable elastomeric keymat further comprising a plurality of pressure transmitters extending from an interior surface of the elastomeric keymat configured to pass through apertures of the cover and to activate key switches located within the cover.

12. Keymat according to claim 11, further comprising one or more guiding pieces.

13. Keymat according to claim 12, wherein said guiding pieces are arranged in direct connection to one or more of said plurality of lips.

14. Keymat according to claim 11, further comprising one or more guiding recesses.

15. Keymat according to claim 14, wherein said one or more guiding recesses are an incision in a surface that is to be in contact with said cover when mounted on said cover.

16. Keymat according to claim 11, being moulded in one piece.

17. A method comprising:
bending an entirety of a bendable elastomeric keymat; and
inserting the bendable elastomeric keymat into a recess of a cover of a communication device so that a plurality of lips of the bendable elastomeric keymat interface with a plurality of locking parts extending from the cover adjacent indentations of the recess, where elastic properties of the bendable elastomeric keymat and the interface between the plurality of lips and the locking parts force the plurality of lips on the keymat into corresponding indentations of the recess for removably securing the keymat in the recess.

18. The method according to claim 17, further comprising inserting one or more guiding pieces of the keymat into one or more corresponding guiding recesses of the cover.

19. The method according to claim 17, further comprising inserting one or more guide pieces of the cover into one or more corresponding guiding recesses of the keymat.

* * * * *